(No Model.)
W. CARMICHAEL.
YOKE FOR CONNECTING ANIMALS.
No. 381,332. Patented Apr. 17, 1888.
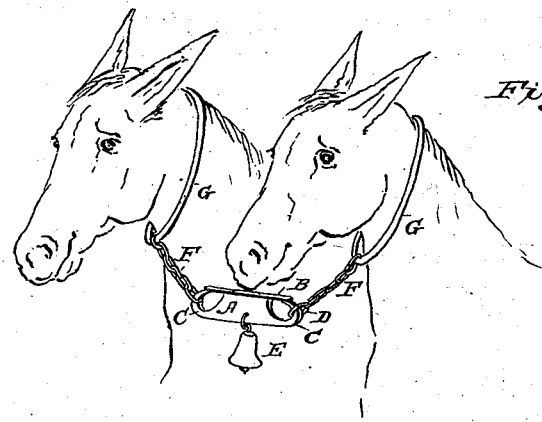
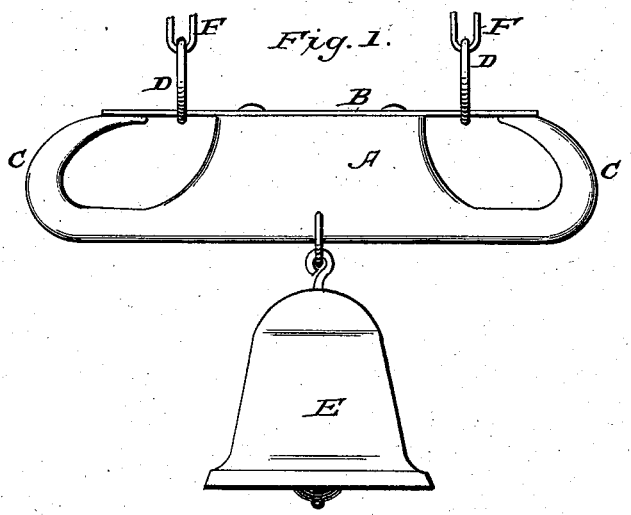
WITNESSES:
Fred G. Dieterich
Edw. W. Byrn.
INVENTOR:
Wm. Carmichael
BY Munn & Co
ATTORNEYS.

UNITED STATES PATENT OFFICE.

WILLIAM CARMICHAEL, OF BAIRD, TEXAS.

YOKE FOR CONNECTING ANIMALS.

SPECIFICATION forming part of Letters Patent No. 381,332, dated April 17, 1888.

Application filed January 5, 1888. Serial No. 259,917. (No model.)

*To all whom it may concern:*

Be it known that I, WILLIAM CARMICHAEL, of Baird, in the county of Callahan and State of Texas, have invented a new and useful Improvement in Animal-Yokes, of which the following is a specification.

The object of my invention is to provide a yoke or coupling for connecting two animals together when grazing, which shall be so constructed as to permit of automatic disconnection in case either of the animals gets a fore leg over the coupling. It is desirable for many reasons to thus couple animals together, and especially mules, in order to prevent them from straying away too far and from jumping fences, and also to facilitate the catching of them again; but it frequently happens that one of the animals gets a fore leg over the coupling and is so seriously injured as to impair its usefulness for life.

My invention is designed to obviate this contingency; and to that end it consists in the peculiar construction of the coupling, which I will now proceed to fully describe with reference to the drawings, in which—

Figure 1 is a detail side view of my invention, and Fig. 2 a view showing the same applied.

A represents a yoke-shaped bar of metal about five or six inches in length, and formed with a hook, C, at each end.

B is a flat spring applied to the middle of bar A and rigidly fastened thereto. This spring extends along the upper edge of bar A and overlaps the end of each hook C, and serves to secure in each hook C a ring, D, that connects with a chain or strap, F, which extends to the collar or halter G about the necks of the two animals. To the bottom side of the bar A is attached a pendent weight, E, which I prefer to construct as a bell. This weight serves always to keep the spring B at the top, and also, when constructed as a bell, facilitates the finding of the team when grazing in wild country.

With the yoke as thus constructed it will be seen that when the animals simply pull away from each other the chain F straightens and the rings D fall into the hooks C C and pull longitudinally with the bar A, in which relation of parts the fastening resists the strain. If, however, one of the animals gets a fore leg over the coupling-chain, the weight E holds the bar A in such position as to keep the spring B at the top, and the pull of the ring D then comes against the spring B, which allows the ring to pass out and thus disconnect the coupling before any injury can be done to the animal.

In making use of my invention I may only have one hook C and one spring B; but I prefer to use two, or one at each end.

The yoke-bar A, with its hooks and spring, may be used in any coupling by simply putting it in the place of some of the links.

Having thus described my invention, what I claim as new is—

1. The coupling-bar A, having its lower side weighted and formed with one or more hooks C, and provided with a spring, B, extending along the upper edge outside of and overlapping the hook, substantially as and for the purpose described.

2. The coupling-bar A, having hooks C at its opposite ends, and provided with a spring, B, extending outside of and overlapping both hooks, substantially as and for the purpose described.

3. The coupling-bar A, having a hook, C, at one or both ends, the bell, E, attached to the lower side of the bar A, and the spring B, extending along the upper edge of the bar and overlapping the hook upon the outside, substantially as shown and described.

4. The combination, with the halters or collars G G and the chain F, of the coupling-bar A, having one or more hooks, C, and a spring, B, overlapping the same upon the outside of the hook, substantially as and for the purpose described.

WILLIAM CARMICHAEL.

Witnesses:
F. S. BELL,
A. A. BELL.